United States Patent
Oshaughnessy et al.

(10) Patent No.: US 7,150,783 B2
(45) Date of Patent: Dec. 19, 2006

(54) DISAZO DYES AND INK JET INKS CONTAINING THEM

(75) Inventors: Helen Ava Oshaughnessy, Manchester (GB); Maria Soteri Hadjisoteriou, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 13 days.

(21) Appl. No.: 10/521,441

(22) PCT Filed: Jul. 14, 2003

(86) PCT No.: PCT/GB03/03053

§ 371 (c)(1),
(2), (4) Date: Jan. 14, 2005

(87) PCT Pub. No.: WO2004/007618

PCT Pub. Date: Jan. 22, 2004

(65) Prior Publication Data

US 2006/0032399 A1    Feb. 16, 2006

(30) Foreign Application Priority Data

Jul. 16, 2002    (GB) ................. 0216539.7

(51) Int. Cl.
C09D 11/02 (2006.01)
C09B 33/02 (2006.01)
B41M 5/00 (2006.01)
B41J 2/01 (2006.01)

(52) U.S. Cl. ............... 106/31.48; 534/797; 428/195.1; 347/100

(58) Field of Classification Search ............ 106/31.48; 534/797; 428/195.1; 347/100
See application file for complete search history.

(56) References Cited

U.S. PATENT DOCUMENTS

| | | | |
|---|---|---|---|
| 3,945,990 A * | 3/1976 | Ikeda et al. ............ | 534/797 |
| 5,006,128 A | 4/1991 | Pedrazzi ................ | 8/437 |
| 5,268,459 A * | 12/1993 | Gregory et al. ......... | 534/758 |
| 5,328,995 A | 7/1994 | Schaulin et al. ........ | 534/797 |
| 5,374,301 A | 12/1994 | Gregory et al. ......... | 106/31.48 |
| 5,519,121 A | 5/1996 | Renner et al. .......... | 106/31.48 |
| 5,948,154 A * | 9/1999 | Hayashi et al. ......... | 106/31.48 |
| 6,277,185 B1 * | 8/2001 | Watson et al. .......... | 106/31.48 |
| 6,290,763 B1 * | 9/2001 | Millard et al. .......... | 106/31.48 |
| 6,767,394 B1 * | 7/2004 | Shawcross et al. ...... | 106/31.48 |
| 6,867,286 B1 * | 3/2005 | Holloway et al. ........ | 534/797 |
| 2005/0241527 A1 * | 11/2005 | Oshaughnessy et al. . | 106/31.48 |
| 2006/0005744 A1 * | 1/2006 | Kitayama et al. ....... | 106/31.48 |

FOREIGN PATENT DOCUMENTS

| | | |
|---|---|---|
| GB | 2 036 780 | 7/1980 |
| JP | 59-59757 | 4/1984 |
| JP | 1-308460 | 12/1989 |
| JP | 10-114061 | 5/1998 |

* cited by examiner

*Primary Examiner*—Helene Klemanski
(74) *Attorney, Agent, or Firm*—Morgan Lewis & Bockius LLP

(57) ABSTRACT

A composition comprising a liquid medium and a compound of Formula (1) or a salt thereof:

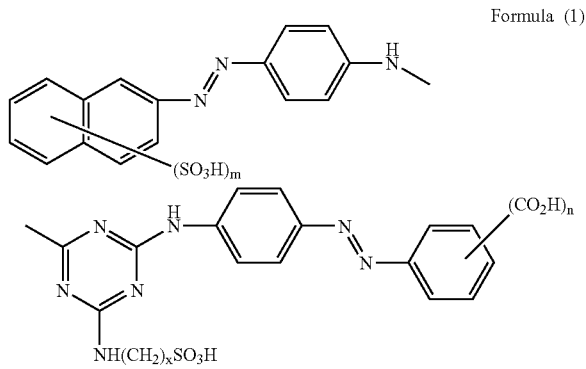

Formula (1)

wherein:
m is 1 or 2;
n is 1 or 2; and
x is 2 to 4.

Also claimed are compounds and printing processes.

7 Claims, No Drawings

DISAZO DYES AND INK JET INKS CONTAINING THEM

This present invention relates to compounds and their salts, to compositions containing such compounds and their use in ink jet printing ("IJP"), to ink jet printer cartridges and to ink jet printing processes.

IJP is a non-impact printing technique in which droplets of coloured liquids are ejected through a fine nozzle onto a substrate without bringing the nozzle into contact with the substrate.

IJP is a relatively inexpensive way of printing multicolour images, for example pictures obtained from digital sources such as electronic cameras, scanners and the Internet. The use of ink jet printers to print colour images in the home or office environment is now becoming commonplace. However IJP has a big disadvantage compared to conventional silver halide photography in that the resultant images fade in ordinary daylight. Thus, there is a need to improve the light-fastness properties of prints is to prevent images fading or vanishing, or becoming discoloured over time.

In addition, there are many demanding performance requirements for colorants and inks used in IJP. For example sharp, non-feathered images having good water-fastness and optical density are required. The inks are required to dry quickly when applied to a substrate to prevent smudging, but they should not form a crust over the tip of an ink jet nozzle which stops the printer from working effectively. The inks should also be stable to storage over time without decomposing by forming a precipitate which could block the fine nozzle. Ideally the inks should also possess good humidity and ozone fastness, have a high tinctorial strength and be bright.

The choice of a colorant in ink jet systems is critical to image quality and fastness. The colorants should also have a high degree of light-fastness after printing onto a substrate. For aqueous inks, the colorants need to be sufficiently soluble in water to prepare a solution that is capable of producing adequate density on the substrate and be stable for extended periods of storage without precipitation.

GB 2036780 describes certain yellow disazo dyes for the conventional dyeing of cellulose-containing materials. The dyes comprise two azo components linked by a 1,3,5-triazine (cyanuric) moiety, where one of the azo components is a disulpho-naphthyl group and the other comprises two phenyl groups.

U.S. Pat. No. 5,519,121 discloses certain cyanuric-linked disazo dyestuffs in printing inks for textiles and paper where one terminal component of the molecule comprises a disulpho-napthyl group and the other terminal component comprises a sulphonated phenyl group.

EP 468647 discloses certain cyanuric-linked disazo yellow dyestuffs for use in inks where both terminal groups independently comprise phenyl or naphthyl, with the proviso that there is at least one carboxylic acid (or thiocarboxylic acid) on a terminal component.

Surprisingly it has been found that compounds of the present invention are excellent colorants for ink jet printing inks.

According to the present invention there is provided a composition comprising liquid medium and a compound of Formula (1) or a salt thereof:

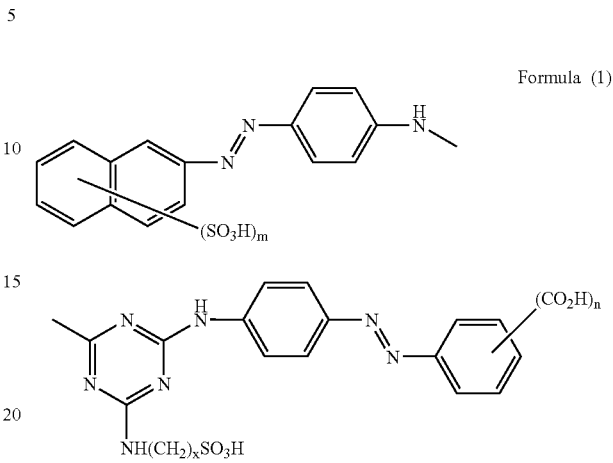

Formula (1)

wherein:

m is 1 or 2;

n is 1 or 2; and x is 2 to 4.

In compounds of Formula (1) m, n and x are preferably 2.

Preferred salts are alkali metal salts (especially lithium, sodium and potassium salts), ammonium and substituted ammonium salts and mixtures thereof. Especially preferred salts are sodium, potassium and lithium salts, salts with ammonia and volatile amines and mixtures thereof. The lithium salts have good solubility, forming particularly storage stable inks with low toxicity and a low tendency to block ink jet nozzles.

The compounds may be converted into a desired salt using known techniques. For example, an alkali metal salt of a compound may be converted into the ammonium or substituted ammonia salt by dissolving an alkali metal salt of the compound in water, acidifying with a mineral acid and adjusting the pH of the solution to pH 9 to 9.5 with ammonia or the amine and removing the alkali metal cations by dialysis or by use of an ion exchange resin.

Examples of amines which may be used to form such salts include methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine, tetramethylamine and mixtures thereof. It is not essential that the dyes are completely in the form of the ammonium salt or substituted ammonium salt and mixed alkali metal and either ammonium salt or substituted ammonium salt are effective, especially those in which at least 50% of the cations are ammonium or substituted ammonium ions.

The above compounds are preferably yellow dyes.

Compounds of Formula (1) may be prepared by condensing an amine of formula $H_2N(CH_2)_xSO_3H$ with a compound of the Formula (2):

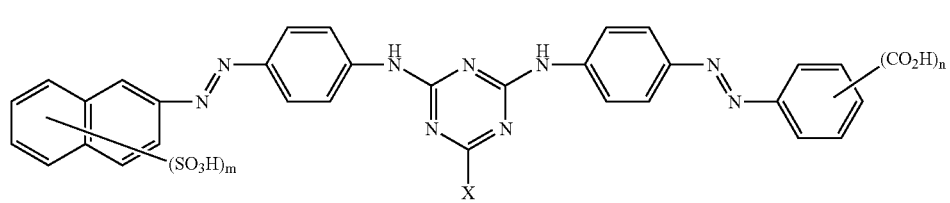

Formula (2)

wherein:
x is a labile atom or group; and
m, n and x are as hereinbefore defined.
Preferably X is halo (especially Cl or F).

The condensation is preferably performed in an aqueous medium, more preferably in water. A pH above 7 is preferred because an alkaline pH removes any HX produced during the course of the condensation.

The condensation is preferably performed at a temperature of 5 to 110° C.

The compound of Formula (2) may be prepared by condensing one equivalent of s-triazine carrying three X groups (e.g. cyanuric chloride) with two amines, one of which is of Formula (3) and the other of Formula (4), wherein X, m and n are as hereinbefore defined. Preferred condensation considerations are as described above.

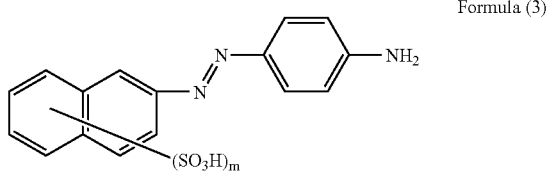

Formula (3)

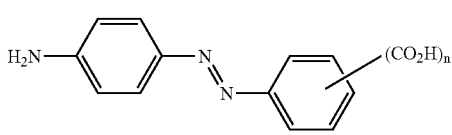

Formula (4)

The amines of Formulae (3) and (4) may be prepared by diazotising amines of Formulae (5) and (6) respectively and coupling the resultant diazonium salt with aniline-ω-methanesulphonate, wherein m and n are as hereinbefore defined.

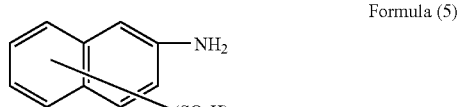

Formula (5)

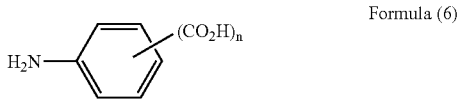

Formula (6)

Typical diazotisation conditions are those usually employed in the dyestuff art, e.g. employing a temperature below 5° C., water, dilute mineral acid and sodium nitrate as diazotising agent.

Alternative methods of preparing compounds of Formula (1) may also be used. For example, the amine $H_2N(CH_2)_x SO_3H$ may be condensed with cyanuric chloride followed by condensation with the amines of Formulae (3) and (4).

The composition of the invention preferably comprises:
(a) from 0.01 to 30 parts of a compound of Formula (1) or salt thereof, as hereinbefore defined; and
(b) from 70 to 99.99 parts of a liquid medium;

wherein all parts are by weight and the number of parts of (a)+(b)=100.

Preferred liquid media include water or a mixture of water and one or more organic solvents.

When the liquid medium comprises a mixture of water and organic solvent, the weight ratio of water to organic solvent is preferably from 99:1 to 1:99, more preferably from 99:1 to 50:50 and especially from 95:5 to 80:20.

It is preferred that any organic solvent present in the mixture of water and organic solvent is water-miscible. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

The pH of the composition is preferably from 4 to 11, more preferably from 7 to 10.

The viscosity of the composition at 25° C. is preferably less than 50 cP, more preferably less than 20 cP and especially less than 5 cP.

When the composition according to the invention is used as ink jet printing compositions, the composition preferably has a concentration of halide ions of less than 500 parts per million, more preferably less than 100 parts per million. It is especially preferred that the composition has less than 100, more preferably less than 50 parts per million of divalent and trivalent metals, wherein parts refer to parts by weight relative to the total weight of the composition. We have found that purifying the compositions to reduce the concentration of these undesirable ions reduces nozzle blockage in ink jet printing heads, particularly in thermal ink jet printers.

The compounds of Formula (1) may be used as the sole colorant in the compositions of the invention because of their attractive yellow shade. However, if desired, one may combine the present compounds with one or more further yellow colorants if a slightly different shade is required for a particular end use. The further colorants are preferably dyes. When further colorants are included in the composition these are preferably selected from but not limited to yellow colorants such as C.I.Direct Yellow 142; C.I.Direct Yellow 132; C.I.Direct Yellow 86; C.I.Direct Yellow 85; C.I.Direct Yellow 173; and C.l.Acid Yellow 23 and combinations thereof.

The composition according to this aspect of the present invention may also contain additional components conventionally used in ink jet printing inks, for example viscosity and surface tension modifiers, corrosion inhibitors, biocides, kogation reducing additives and surfactants which may be ionic or non-ionic.

A third aspect of the present invention provides a process for printing an image on a substrate comprising applying thereto a composition according to the present invention.

The process for printing the image preferably is carried out by means of an ink jet printer. The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably paper, an overhead projector slide or a textile material, especially paper.

Preferred papers are plain or treated papers which may have an add, alkaline or neutral character. Examples of commercially available treated papers include HP Premium Coated Paper, HP Photopaper™ (both available from Hewlett Packard Inc.); Stylus™ Pro 720 dpi Coated Paper, Epson Photo Quality™ Glossy Film, Epson Photo Quality™ Glossy Paper (all available from Seiko Epson Corp.); Canon HR 101 High Resolution™ Paper, Canon GP 201 Glossy™ Paper, Canon HG 101 and HG201 High Gloss™ Film, Canon PR101 (all available from Canon); Kodak Premium™ Photopaper, Kodak Premium™ InkJetpaper (available from Kodak); Konica lnkjet Paper QP™ Professional Photo Glossy, Konica Inkjet Paper QP™ Professional Photo 2-sided Glossy, Konica Inkjet Paper QP™ Premium Photo Glossy, Konica Inkjet Paper Qp™ Premium Photo Silky (available from Konica).

A fourth aspect of the present invention provides an ink jet printer cartridge, optionally refillable, comprising one or more chambers and a composition, wherein the composition is present in at least one of the chambers and the composition is as defined in the first aspect of the invention.

A fifth aspect of the present invention provides separately a paper, an overhead projector slide or a textile material printed with a composition according to the present invention or by means of a process according to the third aspect of the present invention.

A sixth aspect of the present invention provides a compound of Formula (1) or a salt thereof:

Formula (1)

wherein:
m is 1 or 2;
n is 1 or 2; and
x is 2 to 4;

provided that the compound is not of the Formula (A) or a salt thereof:

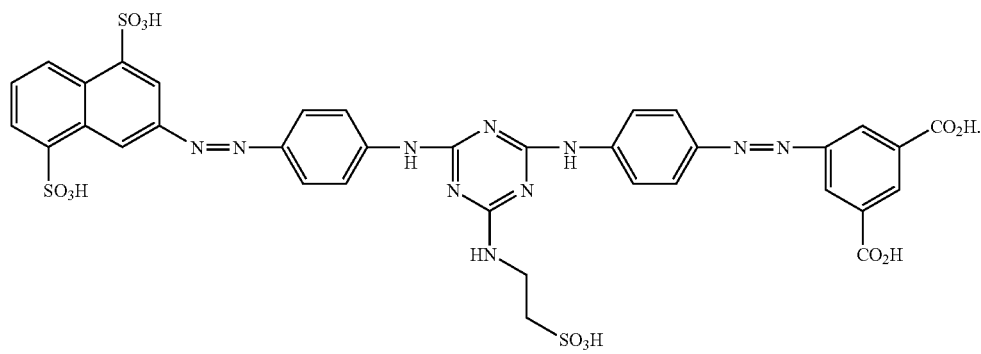

Formula (A)

The invention is further illustrated by the following Examples in which all parts and percentages are by weight unless otherwise stated.

EXAMPLES

Example 1

Preparation of Dye 1:

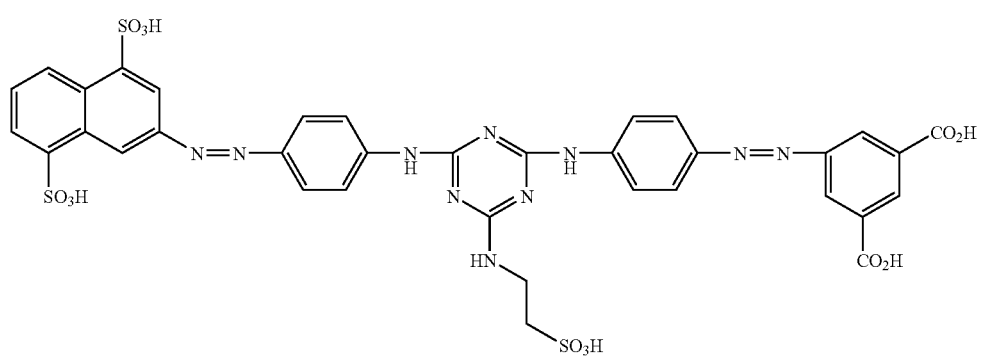

Dye 1

Stage (1) Preparation of 3-[(E)-(4-aminophenyl)diazenyl] naphthalene-1,5-disulphonic acid ("Monoazo(1)").

1,5-disulpho-3-amino-naphthalene (37.8 g) was dissolved in water (400 ml) at neutral pH, sodium nitrite (6.9 g) was added and the mixture was cooled to 0–50° C. Concentrated hydrochloric acid (30 ml) was added, and the mixture was stirred until diazotisation was complete. Excess nitrous acid was destroyed with sulphamic acid, and a solution of aniline-ω-methanesulphonic acid (AMS) (32 g), dissolved in water (300 ml) at neutral pH, was added to the diazonium salt solution. The pH was increased 7 with sodium carbonate, and the reaction mixture was stirred overnight at room temperature. The resultant precipitate was filtered off and the filter cake was resuspended in water (800 ml), sodium hydroxide solution (20 ml) was added, and heated to 60° C. When reaction was complete the mixture was cooled to room temperature, the pH was adjusted to pH 4 and sodium chloride solution (10% w/v) was added to precipitate the product (Monoazo(1)) which was isolated by filtration.

Stage (2) Preparation of 3-[(E)aminophenyl)diazenyl]isophalic acid ("Monoazo(2)").

5-amino-isophthalic acid (18 g) was dissolved in water (200 ml), and the pH was adjusted to pH7 with sodium hydroxide. Sodium nitrite (6.9 g) was added and the mixture was stirred for 5 minutes, then cooled to 0–5° C. Concentrated HCl (35 ml) was added slowly, and stirring continued at 0–5° C. until diazotisation was complete. Excess nitrous was destroyed with sulphamic acid. A solution of AMS (32 g) in water (300 ml) at neutral pH was added to the diazonium salt solution, and the pH was increased to pH7 with sodium carbonate. The mixture was stirred overnight at room temperature, whereupon the precipitated product was filtered off, and resuspended in water (800 ml), and the pH adjusted to pH10 with sodium hydroxide. The mixture was heated mixture to 60–70° C., and when hydrolysis was complete cooled to room temperature, whereupon the pH was adjusted to pH4. A solution of sodium chloride (10% w/v) was added to precipitate the product (Monoazo(2)) which was isolated by filtration.

Stage (3) Preparation of Title Dye

Monoazo(1) (0.2 mol) was dissolved in water at pH7, calsolene oil (2drops) was added and the solution was cooled to 0–5° C. Cyanuric chloride (4 g) added over 10 minutes, during which time the pH was maintained pH 6.5–7 with sodium carbonate solution. The mixture was stirred until reaction was complete, then allowed to warm to room temperature. The pH was adjusted pH7 and the mixture was stirred 1 hour. A solution of Monoazo(2) (0.2mol) in water (100 ml) was added to the above solution, and the pH was maintained at pH7 for 24 hours. When reaction was complete the pH was lowered to pH4 and sodium chloride (20% w/v) was added to precipitate the product, which was isolated by filtration and washed with saturated brine solution. The solid was resuspended in water (500 ml) and 2-aminoethanesulphonic acid (0.6 mol) was added. The pH was adjusted to pH 9.5 and the mixture heated to 70° C. for 6 hours, and subsequently cooled to room temperature and adjusted to pH3 whereupon the product precipitated completely out of solution and was isolated by filtration. The solution was then dialysed using Visking™ tubing (<50 µScm⁻¹) to low conductivity, screened through a cascade of filters (GF/A, GF/D, 0.45 µm) and dried in the oven to give the title product.

Comparative Example 1

Preparation of Comparative Dye 1:

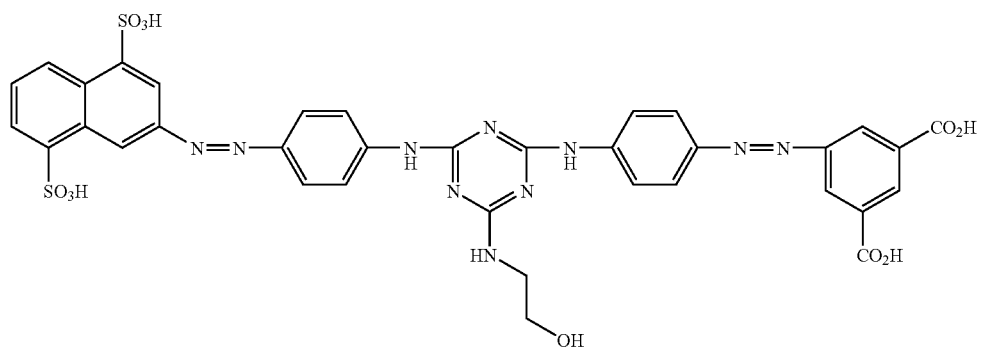

Comparative Dye 1

The method of Example 1 was repeated except that in place of 2-aminoethanesulphonic acid used in Stage (3), there was used ethanolamine, to give the dye indicated above.

Example 2

Ink Formulations and Testing

Ink jet printing inks were prepared according to the following formulation wherein Dye was the dye from Example 1 or the Comparative Example above:

| | |
|---|---|
| 2-Pyrrolidone | 5 parts |
| Thiodiglycol | 5 parts |
| Surfynol ™ 465 | 1 part (from Air Products Inc., USA) |
| Dye | 3 parts |
| Water | 86 parts. |

The inks containing Dye 1 ("Ink 1") or Comparative Dye 1 ("Comparative Ink 1") were printed onto a range of proprietary media using an Epson Stylus™ 880 piezoelectric ink jet printer.

Light Fastness

To evaluate light fastness the prints were irradiated in an Atlas Ci35 Weatherometer™ for 100, 150 and 200 hours. The results are shown in Table 1 where degree of fade is expressed as ΔE where a lower figure indicates higher light fastness. ΔE is defined as the overall change in the CIE colour coordinates L, a, b of the print and is expressed by the equation $\Delta E=(\Delta L^2+\Delta a^2+\Delta b^2)^{0.5}$. These demonstrate that Ink 1 of the invention has better light fastness properties than those of Comparative Ink 1.

TABLE 1

| Ink | Paper | ΔE (100 h LF) | ΔE (150 h LF) | ΔE (200 h LF) |
|---|---|---|---|---|
| Ink 1 | PR101 ™ | 8 | 10 | 10 |
| Ink 1 | Kodak Prem. Picture ™ | 8 | 10 | 12 |
| Ink 1 | Epson Premium ™ | 2 | 4 | 5 |
| Comparative Ink 1 | PR101 ™ | 11 | 13 | 13 |
| Comparative Ink 1 | Kodak Prem. Picture ™ | 11 | 11 | 13 |
| Comparative Ink 1 | Epson Premium ™ | 3 | 5 | 6 |

Ozone Fastness

The printed substrates were then assessed for ozone stability using an ozone test cabinet from Hampden Test Equipment. The test was carried out for 24, 48 and 72 hours at 40° C. and 55% relative humidity in the presence of 400 parts per hundred million of ozone. Fastness of the printed ink to ozone was judged by the difference in the optical density before and after exposure to ozone using an Xrite 983™ Spectrodensitometer. Thus, the lower the % OD loss the greater the ozone fastness. Results are shown below in Table 2 and these clearly demonstrate that inks based on compounds of this invention display good ozone fastness.

TABLE 2

| Ink | Paper | OD | % OD loss 24 h | % OD loss 48 h | % OD loss 72 h |
|---|---|---|---|---|---|
| Ink 1 | PR101 ™ | 1.37 | 1 | 4 | 6 |
| Ink 1 | GP301 ™ | 1.44 | 2 | 7 | 10 |
| Ink 1 | HR101 ™ | 1.28 | 2 | 3 | 5 |
| Ink 1 | Kodak Prem. Picture ™ | 1.40 | 1 | 0 | 0 |
| Ink 1 | Epson Premium ™ | 1.33 | 0 | 1 | 2 |
| Comparative Ink 1 | PR101 ™ | 1.34 | 1 | 4 | 6 |
| Comparative Ink 1 | GP301 ™ | 1.43 | 3 | 9 | 13 |

TABLE 2-continued

| Ink | Paper | OD | % OD loss 24 h | % OD loss 48 h | % OD loss 72 h |
|---|---|---|---|---|---|
| Comparative Ink 1 | HR101 ™ | 1.26 | 2 | 4 | 6 |
| Comparative Ink 1 | Kodak Prem. Picture ™ | 1.38 | 1 | 0 | 0 |
| Comparative Ink 1 | Epson Premium ™ | 1.32 | 2 | 3 | 4 |

Ink 1: Dye is Dye 1 from Example 1
Ink 2: Dye is Comparative Dye 1 from Example 1

Further inks may be prepared in a similar fashion according to the formulations shown in Tables (I) and (II) wherein the dye described in the first column is the Dye 1 from Example 1, and wherein numbers quoted in the second column onwards refer to the number of parts of the relevant ingredient and all parts are by weight. The inks may be applied to paper by thermal or piezo ink jet printing.

The following abbreviations are used in Table (I) and (II):
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2diol
BDL=butane-2,3-diol
CET=cetyl ammonium bromide
PHO=$Na_2HPO_4$ and
TBT=tertiary butanol
TDG=thiodiglycol

TABLE I

| Dye Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 | | 6 | 4 | | | | | 5 | |
| 3.0 | 90 | | 5 | 5 | | 0.2 | | | | | |
| 10.0 | 85 | 3 | | 3 | 3 | | | | 5 | 1 | |
| 2.1 | 91 | | 8 | | | | | | | | 1 |
| 3.1 | 86 | 5 | | | | | 0.2 | 4 | | | 5 |
| 1.1 | 81 | | | 9 | | 0.5 | 0.5 | | | 9 | |
| 2.5 | 60 | 4 | 15 | 3 | 3 | | | 6 | 10 | 5 | 4 |
| 5 | 65 | | 20 | | | | | 10 | | | |
| 2.4 | 75 | 5 | 4 | | 5 | | | | 6 | | 5 |
| 4.1 | 80 | 3 | 5 | 2 | 10 | | 0.3 | | | | |
| 3.2 | 65 | | 5 | 4 | 6 | | | 5 | 4 | 6 | 5 |
| 5.1 | 96 | | | | | | | | 4 | | |
| 10.8 | 90 | 5 | | | | | | 5 | | | |
| 10.0 | 80 | 2 | 6 | 2 | 5 | | | 1 | | 4 | |
| 1.8 | 80 | | 5 | | | | | | | 15 | |
| 2.6 | 84 | | | 11 | | | | | | 5 | |
| 3.3 | 80 | 2 | | | 10 | | | | 2 | | 6 |
| 12.0 | 90 | | | | 7 | 0.3 | | 3 | | | |
| 5.4 | 69 | 2 | 20 | 2 | 1 | | | | | 3 | 3 |
| 6.0 | 91 | | | 4 | | | | | | 5 | |

TABLE II

| Dye Content | Water | PG | DEG | NMP | CET | TBT | TDG | BDL | PHO | 2P | PI2 |
|---|---|---|---|---|---|---|---|---|---|---|---|
| 3.0 | 80 | 15 | | | 0.2 | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | 5 | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 10.0 | 91 | | | 6 | | | | | | 3 | |
| 9.0 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | 10 | | | | | | | | |
| 2 | 88 | | | | | | 10 | | | | |
| 5 | 78 | | | 5 | | | 12 | | | 5 | |
| 8 | 70 | 2 | | 8 | | | 15 | | | 5 | |
| 10 | 80 | | | | | | | 8 | | | 12 |
| 10 | 80 | | 10 | | | | | | | | |

The invention claimed is:

1. A composition comprising a liquid medium and a compound of Formula (1) or a salt thereof:

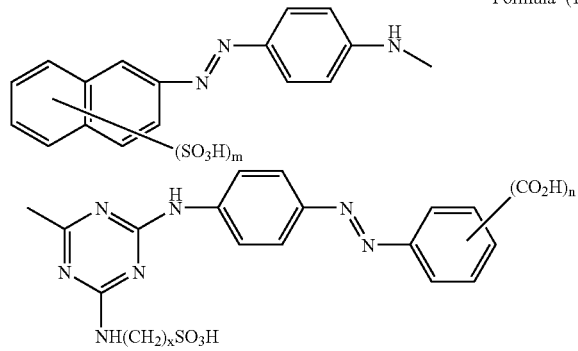

Formula (1)

wherein:
m is 1 or 2;
n is 1 or 2; and
x is 2 to 4.

2. A composition according to claim 1 wherein the liquid medium comprises a mixture of water and one or more organic solvents.

3. A process for printing an image on a substrate comprising applying thereto a composition according to claim 1 or 2.

4. An ink jet printer cartridge, optionally refillable, comprising one or more chambers and a composition, wherein the composition is present in at least one of the chambers and the composition is as defined in claim 1 or 2.

5. A paper, an overhead projector slide or a textile material printed with a composition according to claim 1 or 2.

6. A compound of Formula (1) or a salt thereof:

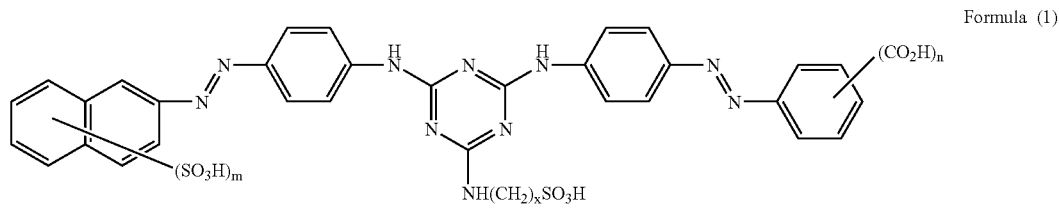

Formula (1)

wherein:
m is 1 or 2;
n is 1 or 2; and
x is 2 to 4;
and provided that the compound is not of the Formula (A) or a salt thereof:

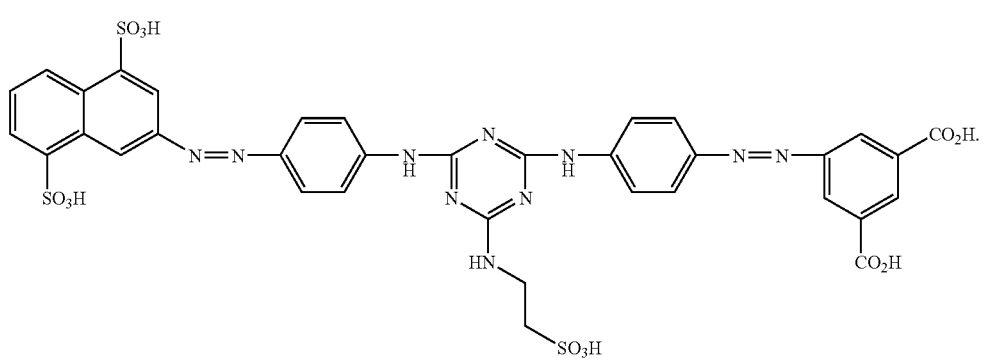

Formula (A)

7. A paper, an overhead projector slide or a textile material printed by a process according to claim 3.

* * * * *